(12) United States Patent
Yang et al.

(10) Patent No.: US 8,768,339 B2
(45) Date of Patent: Jul. 1, 2014

(54) METHOD AND APPARATUS FOR PROVIDING LONG TERM EVOLUTION SERVICE OUTAGE AND DEGRADATION MANAGEMENT

(75) Inventors: Chen-Yui Yang, Marlboro, NJ (US);
Paritosh Bajpay, Edison, NJ (US);
David H. Lu, Morganville, NJ (US);
Anthony Mark Srdar, Gainesville, GA (US); Fang Wu, Redmond, WA (US);
Minghsien Wang, Marlboro, NJ (US);
Quangchung Yeh, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 97 days.

(21) Appl. No.: 12/969,507

(22) Filed: Dec. 15, 2010

(65) Prior Publication Data
US 2012/0157089 A1 Jun. 21, 2012

(51) Int. Cl.
*H04W 24/00* (2009.01)

(52) U.S. Cl.
USPC .......................................... 455/423

(58) Field of Classification Search
CPC ...... H04W 16/18; H04W 16/22; H04W 24/00; H04W 24/06; H04W 24/08
See application file for complete search history.

(56) References Cited

U.S. PATENT DOCUMENTS

| | | | | |
|---|---|---|---|---|
| 2006/0256759 | A1* | 11/2006 | Sayeedi | 370/335 |
| 2009/0149173 | A1* | 6/2009 | Tolaio | 455/424 |
| 2010/0284293 | A1* | 11/2010 | Watanabe et al. | 370/252 |
| 2011/0319071 | A1* | 12/2011 | Beppler et al. | 455/424 |

* cited by examiner

*Primary Examiner* — Patrick Edouard
*Assistant Examiner* — Shantell L Heiber (57) ABSTRACT

A method and apparatus for enabling a wireless communication service provider to remotely provide wireless network service outage and/or degradation detection, isolation, and restoration relating to a base station are disclosed. For example, the method detects a wireless service problem, and isolates the wireless service problem to a base station of a plurality of base stations of the wireless communication network, wherein the wireless service problem comprises a wireless service degradation. The method then performs a recovery task remotely on the base station to address the wireless service degradation.

16 Claims, 5 Drawing Sheets

METHOD AND APPARATUS FOR PROVIDING LONG TERM EVOLUTION SERVICE OUTAGE AND DEGRADATION MANAGEMENT

The present disclosure relates generally to communication network and, more particularly, to a method and apparatus for providing Long Term Evolution (LTE) service outage and degradation management of a base station, known as an eNodeB, in a wireless communication network.

BACKGROUND

In a 3GPP Long Term Evolution (LTE) network, service outages and degradation can be difficult to detect (e.g., a sleeping cell) and will require considerable manual effort for troubleshooting. These service outages or degradations are difficult to detect because of the self-healing aspect of the LTE network. For example, services in a failed cell site can be automatically covered by neighboring cell sites. Hence, the failed or degraded cell site can remain in a failed or degraded state without being noticed for a period of time. This type of service outage or degradation may go undetected for hours or even days. Furthermore, troubleshooting can require manual analysis and unplanned site visits that will increase network maintenance costs for the service provider.

SUMMARY

In one embodiment, the present method and apparatus enable a wireless communication service provider to remotely provide wireless network service outage and/or degradation detection, isolation, and restoration relating to a base station. For example, the method detects a wireless service problem, and isolates the wireless service problem to a base station of a plurality of base stations of the wireless communication network, wherein the wireless service problem comprises a wireless service degradation. The method then performs a recovery task remotely on the base station to address the wireless service degradation.

In an alternate embodiment, the method detects a wireless service problem, and isolates the wireless service problem to a base station of a plurality of base stations of the wireless communication network, wherein the wireless service problem comprises a wireless service outage. The method then performs a recovery task remotely on the base station to address the wireless service outage.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, in a 3GPP Long Term Evolution (LTE) network, wireless service outages and wireless service degradations (broadly referred to as a wireless service problems) can be difficult to detect (e.g., a sleeping cell) and will require considerable manual effort for troubleshooting. Broadly, a wireless service outage comprises a scenario where a wireless service is not being provided at all by a network element, e.g., an eNodeB, whereas a wireless service degradation comprises a scenario where a wireless service is being provided by a network element, e.g., an eNodeB, but the wireless service is being provided below a performance level previously specified for the wireless service.

To address this criticality, the present method and apparatus enable a wireless communication service provider to proactively support wireless network service outage and degradation (e.g., a LTE network service outage and degradation) detection, isolation, and/or restoration. In one embodiment, the present disclosure detects and isolates service outages, resolves one or more problems, and then quickly restores affected customers to normal wireless service with a minimal amount of downtime in the wireless network, e.g., a LTE network. The present disclosure enables automated service outage detection and analysis that require a minimal or no manual intervention by a wireless communication service provider. In particular, the present disclosure enables automated service outage and/or service degradation detection, isolation, and/or restoration for both logical and physical components of eNodeB systems in a LTE network. Broadly defined, an eNodeB is a base transceiver station (BTS) as per the 3GPP standards (or simply referred to as a base station). An eNodeB provides the LTE air interface and performs radio resource management for wireless access. 3GPP is a global effort to define a wireless communication system specification. In 3GPP release 8, LTE is a set of enhancements to the Universal Mobile Telecommunications System (UMTS) which focuses on adopting 4th Generation (4G) mobile communication's technology including an all-Internet Protocol (IP) end-to-end networking architecture. It should be noted that although the present disclosure is discussed in the context of LTE, the present disclosure is not so limited. Namely, the method and apparatus of the present disclosure can be adapted to any wireless network.

Figure 1:
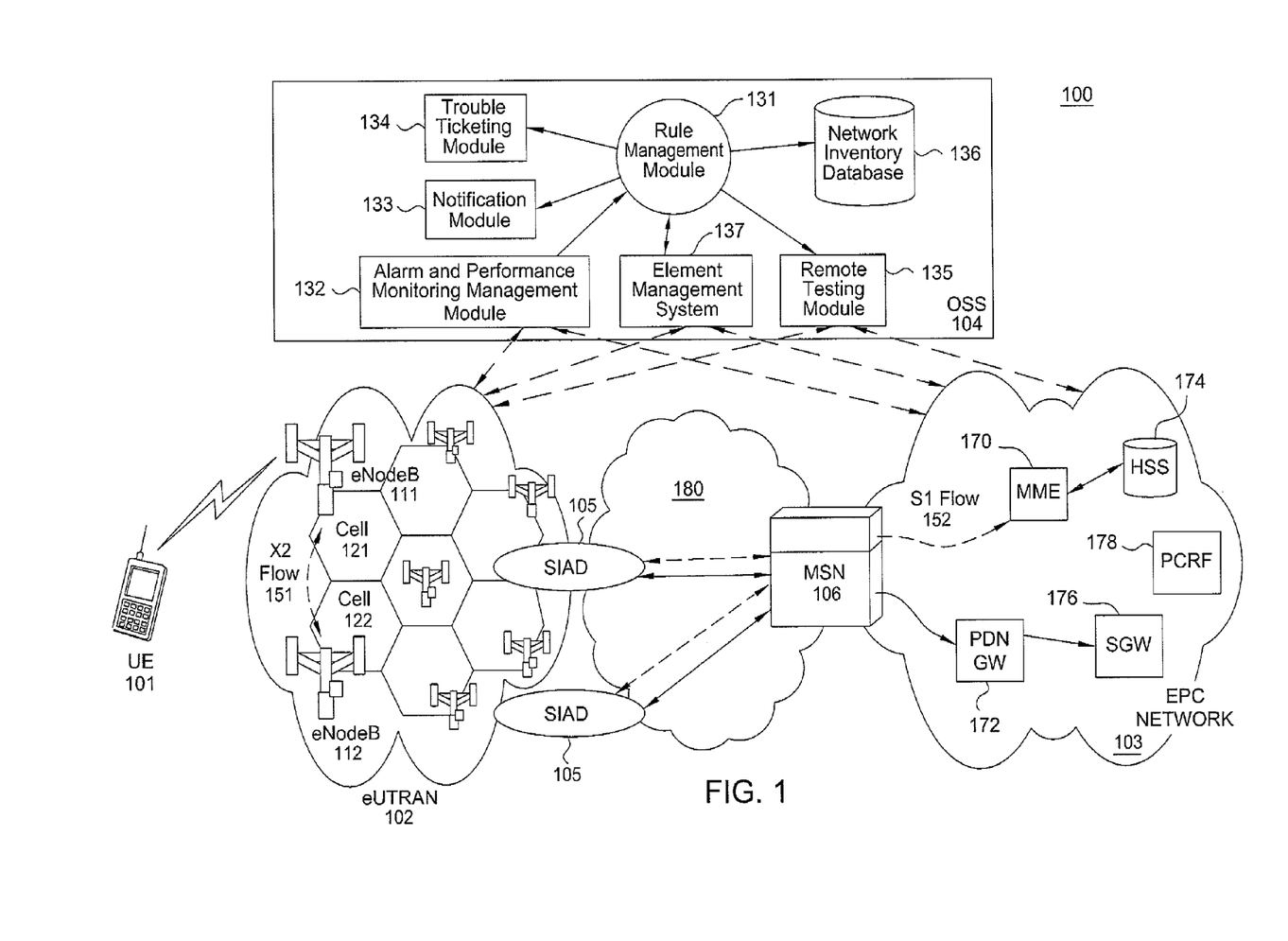
FIG. 1 illustrates an exemplary LTE network related to the present disclosure.

FIG. 1 illustrates an exemplary LTE network 100 related to the present disclosure. In one embodiment, the LTE network 100 comprises an access network 102 (e.g., an evolved Universal Terrestrial Radio Access Network (eUTRAN)), a core network 103 (e.g., an Evolved Packet Core (EPC) network) and an Operations Support System (OSS) 104 supported by a wireless service provider. User Equipment (UE) 101 accesses wireless services via an eNodeB, e.g., eNodeB 111 in the eUTRAN 102. UE 101 can be a smart phone, a computer or laptop, or any endpoint devices equipped with 4G wireless capabilities. An eNodeB, such as eNodeB 111, provides wireless interfaces to one or more UE devices. It should be noted that an eUTRAN, e.g. eUTRAN 102, comprises one or more eNodeBs, e.g., 111 and 112. All eNodeBs in the eUTRAN 102 are connected to the EPC network 103 via one or more integrated access device 105 (e.g., a Smart Integrated Access Device (SIAD)). Broadly, an integrated access device is capable of integrating both voice and data services within a single device. In eUTRAN 102, eNodeB 111 supports wireless services covered by cell site 121 and eNodeB 112 supports wireless services covered by cell site 122.

In one embodiment, SIAD 105 is connected to the EPC network 103 via a Multi-service Node (MSN) 106 of a cell site backhaul (CSBH) 180. An EPC network provides key functions that support wireless services in the LTE environment. In one embodiment, an EPC network is an Internet Protocol (IP) packet core network that supports both real-time and non-real-time service delivery across a LTE network, e.g., as specified by the 3GPP standards.

In one embodiment, network devices Mobility Management Entity (MME) 170 and Serving Gateway (SGW) 176 support key functions as part of the LTE network. For example, MME 170 is the control node for the LTE access-network. It is responsible for UE (User Equipment) tracking and paging (e.g., such as retransmissions), bearer activation and deactivation process, selection of the SGW, and authentication of a user. SGW 176 routes and forwards user data packets, while also acting as the mobility anchor for the user plane during inter-eNodeB handovers and as the anchor for mobility between LTE and other wireless technologies, such as 2G and 3G wireless networks.

In addition, in EPC network 103, the Home Subscriber Server (HSS) 174 contains subscription-related information (e.g., subscriber profiles), performs authentication and authorization of a wireless service user, and provides information about the subscriber's location. The Policy Charging and Rule Function (PCRF) 178 supports accesses to subscriber databases and specialized functions of a charging system. The Public Data Network Gateway (PDN GW) 172 is a gateway that provides access between the EPC network 103 and the public data network.

In one embodiment, the SIAD is a device that provides wireless traffic aggregation and backhaul from a cell site to an EPC network. An MSN provides layer 2 and layer 3 networking functions for wireless service between one or more SIADs and the EPC network and the eUTRAN is the air interface of the 3GPP's Long Term Evolution (LTE) specifications for mobile networks. Namely, the eUTRAN comprises a radio access network standard that will replace previous generations of air interface standards.

In one embodiment, the OSS 104 comprises a collection of modules that provides wireless service outage and degradation detection, and/or isolation, as well as service restoration. For example, the OSS 104 comprises a Rule Management Module (RMM) 131, an Alarm and Performance Monitoring Management Module 132, a Notification Module (NM) 133, a trouble ticket using Ticketing Module (TM) 134, a Remote Testing Module (RTM) 135, a Network Inventory Database (NID) 136, and an Element Management System (EMS) 137. The functions performed by these modules will be described below.

In one embodiment, the Rule Management Module (RMM) 131 supports a rule engine used to detect, and/or isolate wireless service outages and degradations as well as to restore normal services. For example, RMM 131 uses information collected by the Alarm and Performance Monitoring Management Module 132 as inputs to support the wireless service outage detection, isolation, and restoration. RMM 131 provides the following service outage related correlations, including intra-device correlation for all EPC network elements, inter-device topology-based alarms correlation (e.g., between an eUTRAN network device and an EPC network device, and between two EPC network devices etc.), inter-cell based alarms correlation (e.g., between the Radio Access Network and the transport network), and S1 interface and X2 interface pool-based alarms correlation. Note that the S1 and X2 interfaces are standard interfaces defined by the 3GPP standard.

In FIG. 1, X2 interface flow 151 is used to communicate alarm information between two eNodeBs, e.g., between eNodeB 111 and eNodeB 112; S1 interface flow 152 is used to communicate alarm information between an eNodeB, such as eNodeB 111, and EPC network 103.

In one embodiment, the Alarm and Performance Monitoring Management Module 132 collects all alarms, alerts, error messages, and performance monitoring parameters from all of the network elements in the eUTRAN 102 and EPC network 103, including all eNodeB, SIAD, MSN, and cell site power outage alarms. RMM 131 uses the collected information to perform root cause analysis for problem identification and isolation purposes.

In one embodiment, if a service outage or degradation is detected, RMM 131 will automatically create a trouble ticket using Ticketing Module (TM) 134. RMM 131 will communicate with the Network Inventory Database (NID) 136 to obtain network element configuration data, e.g., configuration data of the eNodeBs in the eUTRAN 102.

In one embodiment, the Element Management System (EMS) 137 is a module that provides management of one or more specific types of network elements in LTE network 100. For example, EMS functions include, but are not limited to, configuration and reconfiguration support of a network element. RMM 131 communicates with a network element, e.g., eNodeB 111, via the EMS 137 to retrieve configuration data residing in the network element and then compare them with those obtained from the NID 136 to determine if a configuration mismatch exists for that particular network element. If RMM 131 determines that a configuration data mismatch exists, then RMM 131 can replace the existing configuration data residing in the network element, via the EMS 137, with the configuration data obtained from the NID 136.

Once a problem is isolated, RMM 131 uses Remote Testing Module (RTM) 135 to perform remote troubleshooting and testing of an identified eNodeB in the eUTRAN. In turn, RTM 135 provides test results back to the RMM 131 so that problem location can be verified. In addition, RMM 131 uses the EMS 137 to perform recovery procedures to restore services in the eUTRAN. However, if a service outage or degradation cannot be automatically restored, RMM 131 will use the Notification Module (NM) 133 to automatically notify the network operations center for special handling, e.g., when manual intervention is required.

As discussed above, the LTE (Long Term Evolution) network consists of Evolved Universal Terrestrial Radio Access Network (E-UTRAN), Evolved Packet Core (EPC) network and Transport elements, based on an all IP network. In the LTE network, the development in E-UTRAN is concentrated on one node, the evolved Node B (eNodeB). All radio functionality is collapsed there, i.e., the eNodeB is the termination point for all radio related protocols. As a network, E-UTRAN is simply a mesh of eNodeBs connected to neighboring eNodeBs with the X2 interface.

In one embodiment, the EPC may comprise the following nodes: Mobility Management Entity (MME), Home Subscriber Server (HSS), Serving Gateway (SGW), PDN Gateway (PGW), and Policy and Charging Rules Function (PCRF). One of the big architectural changes in the core network area is that the EPC does not contain a circuit switched domain, and no direct connectivity to traditional circuit switched networks such as ISDN or PSTN is needed in this layer. Functionally the EPC is equivalent to the packet switched domain of the existing 3GPP networks. There are, however, significant changes in the arrangement of functions and most nodes and the architecture in this part should be considered to be completely new.

In one embodiment, a Cell Site BackHaul (CSBH) transport network 180 communicates with eNodeBs and EPC (MME, S/P-GW). For example, the CSBH network includes SIAD and MSN via an access transport network. The short haul connectivity between eNode B-SIAD can be Ethernet, either GigE or FastE. The backhaul connectivity (long-haul) between the SIAD-MSN will be a physical GigE interface to the Ethernet Service provider to the MSN. These two crucial nodes connect to the wide area transport (Ethernet or TDM) and provide the IP routing and aggregation functions for eNodeB S1u, S1c and X2 interfaces as well as the OAM traffic for the eNodeB.

In one embodiment, smart Integrated Access Device (SIAD), presently deployed within network cell sites consolidates different types of traffic. The SIAD is acting as an IP router and will, make a routing decision based on the IP address, and repackage the IP packet into a new Ethernet frame on the transport side. The IP path between eNodeB and other EPC NEs are: eNodeB-SIAD/MSN-EPC NEs. The MSN will aggregate and route eNodeB traffic (S1c and S1u) to the EPC (MME and SGW) locations. The X2 traffic between eNodeBs is also routed via the MSN.

In one embodiment, the present disclosure focuses on trouble management of eNodeB (eNB) which includes correlations of location alarms from the eNB and adjacent alarms from other LTE related devices such as MME and SGW, and cell cite backhaul (CSBH) transport elements such as SIAD and MSN. The present methodology and management structure support an automation process for performing auto trouble detection and isolation actions. It provides several capabilities: outage/degradation prediction, outage/degradation proactive detection, outage/degradation Isolation, and outage/degradation restoration.

Outage/degradation prediction provides early warning of a potential outage/degradation, to reduce detection and trouble isolation time. The present disclosure will use a predicative signature such as a self-healing alarm of "eNB restart" to trigger auto diagnostic.

Outage/degradation proactive detection provides detection of an outage using information from all EUTRAN device and EPC alarms and performance events including measurements, alarms, counters, timers, statistics, KPIs etc, and plus 2G/3G, SIAD/MSN and cell site power alarms to perform location-based correlation.

Outage/degradation isolation provides fault/performance events correlation for determining the root cause of a service outage or degradation and sectionalization and isolation to verify and confirm problem locations to EUTRAN Network, or EPC Network, or Ethernet Backhaul Network, CBB Network (when applicable). The following trouble isolations will be supported:

eNB device alarms based on equipment topology correlation,
Inter-device topology-based alarms correlation (EUTRAN-EPC, EPC-EPC devices)
Inter-cell based alarms based on EUTRAN and CSBH correlation, and
S1/X2 interface alarms based on pool topology correlation.

Outage/degradation restoration performs auto recovery tasks (e.g., reset card, bounce ports, adjust antenna parameters, etc).

Figure 3:
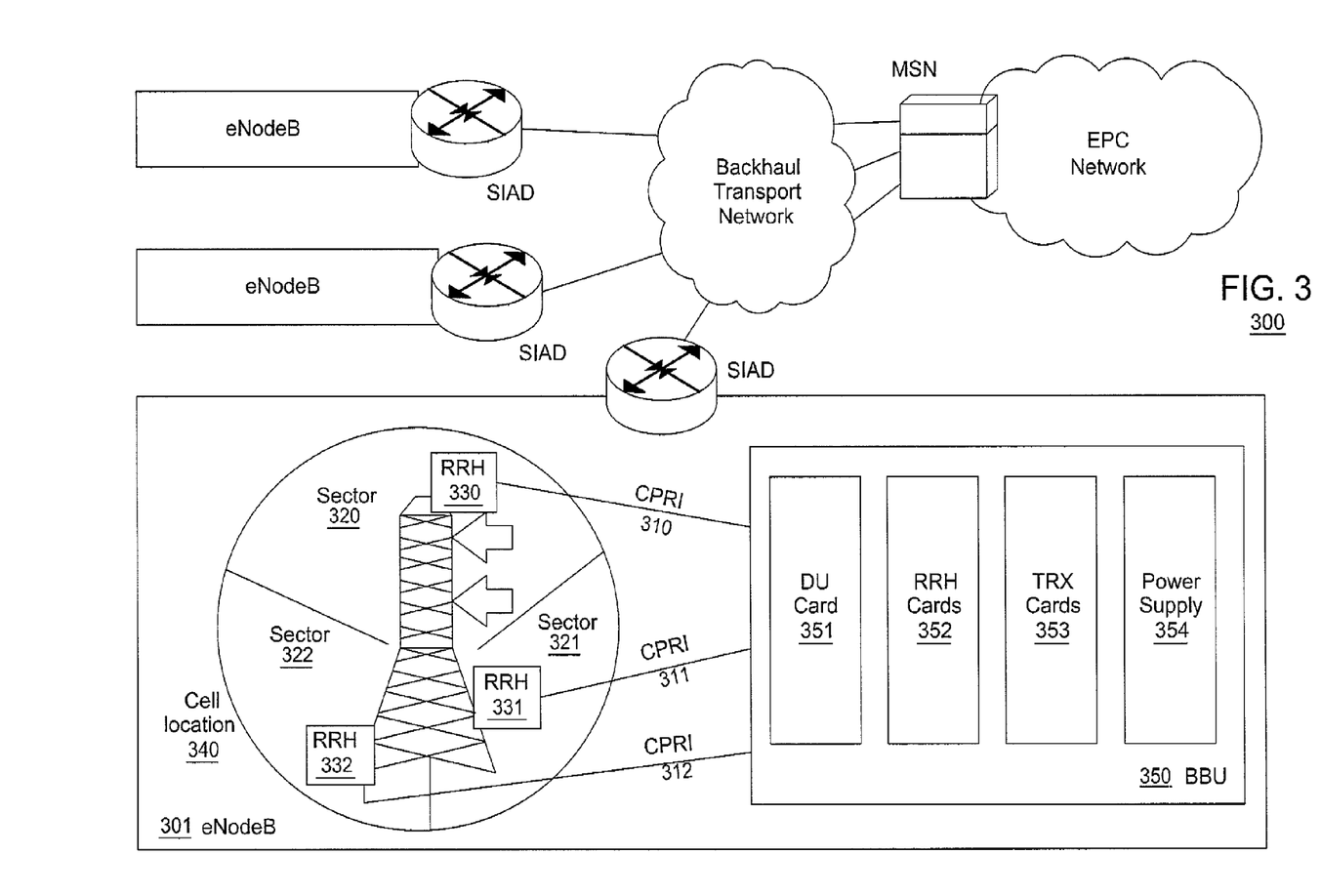
FIG. 3 illustrates an exemplary LTE network related to the present disclosure having a plurality of eNodeBs.

FIG. 3 illustrates an exemplary LTE network 300 related to the present disclosure having a plurality of eNodeBs. For example, in one embodiment each eNodeB is illustrated as communicating with the EPC network via a backhual transport network 360. More specifically, in FIG. 3, LTE network 300 provides a detailed view of an eNodeB. It should be noted that this is only one illustrative example of one implementation of the eNodeB. Other implementations of the eNodeB are within the scope of the present disclosure.

In one embodiment, the eNodeB 301 comprises various physical components: a Baseband Unit (BBU) 350, and one or more Remote Radio Head (RRH) units 330, 331, and 332. Broadly, remote radio heads are part of a distributed base station system in which all radio-related functions are contained in the remote radio heads. These remote radio heads are units that are mounted on a tower and linked to a main unit, e.g., the BBU that contains the control and baseband signal processing. Thus, the BBU provides digital processing functions while the separate RRH units provide radio frequency functions. In one embodiment, the RRH units 330, 331, and 332 are connected to the BBU 350 via Common Public Radio Interfaces (CPRI) 310, 311, and 312, respectively. In one embodiment, a CPRI is an optical fiber communication link that can span up to 8 miles.

In one embodiment, the BBU 350 map comprises various physical components: Digital Unit (DU) card 351, RRH cards 352, Transceiver (TRX) cards 353, and a power supply 354. It should be noted that an eUTRAN site contains an eNodeB device and can be physically located within the cell site location. The eNodeB contains a BBU device that connects to the RRH devices by CPRI over an optical fiber or a cable. The BBU contains a DU card, RRH cards, TRX (Transceiver) Cards and a power supply. In one embodiment, the RHH card is the site manager for BTS equipment in this site. A cell site is divided into several sectors, where the TRXs are assigned to the sectors.

RRH units 330, 331, and 332 serve cell sectors 320, 321, and 322, respectively, of cell site location 340. Configuration data residing in each of the aforementioned physical components can be retrieved via the EMS by the RMM. RRH units 330, 331, and 332 handle radio frequency functions such as signal filtering, duplexing, transmit and receive amplification, up and down frequency conversion, local oscillator generation, low noise amplification, uplink and downlink signal filtering, as well as analog to digital and digital to analog conversion. These are only illustrative functions and should not be interpreted as exhaustive.

Figure 2:
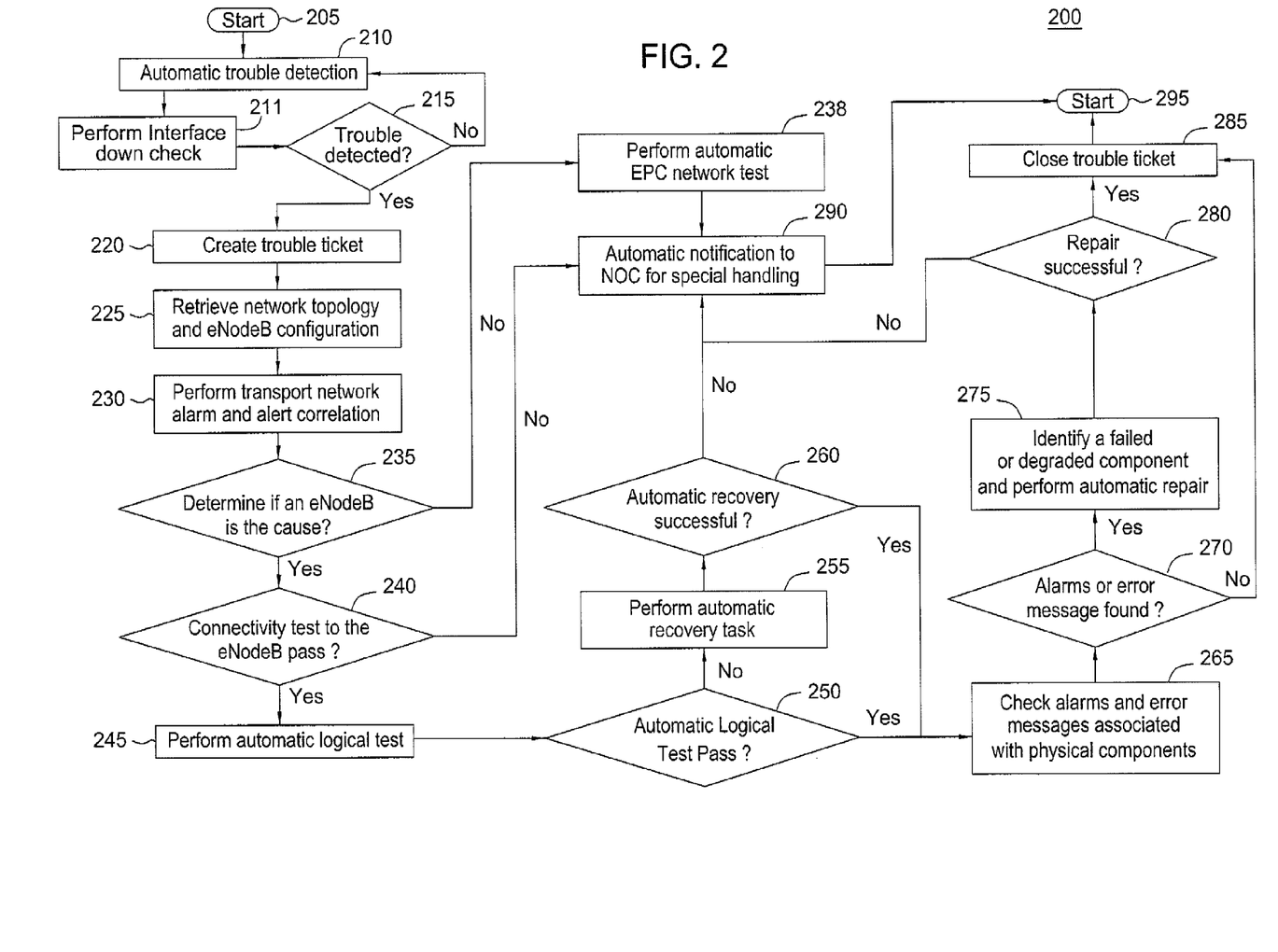
FIG. 2 illustrates a flow chart of a method for detecting, isolating, and restoring wireless service outages and degradation caused by an eNodeB of the present disclosure.

FIG. 2 illustrates a flow chart of a method 200 for detecting, isolating, and/or restoring wireless service outages and degradation caused by an eNodeB of the present disclosure. For example, one or more steps of method 200 can be implemented by the OSS 104. Method 200 starts in step 205 and proceeds to step 210.

In step 210, a RMM may continually perform automatic trouble detection analysis via alarms, alerts, error messages, and/or performance monitoring parameters provided by an alarm and performance monitoring management module. For example, any alarms or error messages will be made aware to the RMM and/or network performance statistics (e.g., jitter, loss packet rate, abnormal terminations, e.g., dropped sessions, access request failure rate, and the like) can be gathered and provided to the RMM on a regular basis, e.g., every 5 minutes, every 10 minutes, and so on. Thus, the trouble detection of method 200 can be based on an alarm analysis (e.g., triggered by an alarm or error message) or a performance analysis (e.g., triggered by a network performance parameter reaching a threshold, e.g., a predefined excessive packet loss rate has been reached) or both.

In one embodiment, there are several types of warning signatures: 1) predicative alarms, 2) proactive alarms, and 3) interface and/or protocol alarms.

Predicative alarms can be used as an early warning of a potential outage/degradation, and to reduce detection and trouble isolation time. The present disclosure will use a predicative signature such as a self-healing alarm of "eNB restart" to trigger auto diagnostic.

Proactive alarms can be used as a detection of an outage using information from all EUTRAN devices and EPC alarms and performance events including measurements, alarms, counters, timers, statistics, KPIs etc, and plus 2G/3G, SIAD/MSN and cell site power alarms to do location-based correlation.

Interface and/or Protocol Alarms can be used as a detection of S1/X2 interface and associated with protocol alarms and PM errors.

In one embodiment, based on the alarm analysis, a number of suspected network elements, such as an eNodeB or a transport network link, can be identified. For example, a service outage can be identified using collected equipment failure alarms and service degradation can be identified using collected Key Performance Indicators (KPI) and Key Quality Indicators (KQI) by the RMM.

Equipment failure alarms can indicate failure of a physical component of a network element or a network link facility used to connect network elements in the LTE network. In one embodiment, a major physical component alarm, such as a circuit card failure alarm, can indicate the failure of a particular physical component in a network element, e.g., one of the eNodeBs. In another embodiment, a major network facility alarm, such as a loss of signal (LOS) alarm, can indicate the failure of a network link connecting two corresponding network elements, e.g., between an eNodeB and an SIAD. In another embodiment, a major network element connectivity alarm, such as network element unreachable or no response, can indicate the failure of the network element, e.g., one of the eNodeBs. In another embodiment, a major alarm, such as an automatic restart alarm associated with a cell site, can indicate that a particular cell site served by an eNodeB is suffering service problems.

In one embodiment, based on a performance analysis, KPI and KQI are performance monitoring parameters used to monitor the service quality of an eUTRAN. KPI and KQI include, but are not limited to, a successful bearer setup rate, a dropped call rate, an uplink and downlink block error rate, a packet latency parameter, an average ping delay parameter, and a Guaranteed Bit Rate (GBR), etc. A KPI or KQI parameter below or above a predefined threshold can indicate a service degradation in an eUTRAN.

In one embodiment, an eNodeB, such as eNodeB 111 in FIG. 1, detects that one of the RRHs associated with the eNodeB is having a service affecting radio transceiver problem. Alarms associated with the outage are then sent by the eNodeB to the Alarm Performance Monitoring Management Module, such as Alarm Performance Monitoring Management Module 132 in FIG. 1, to the EPC network, such as EPC network 103 in FIG. 1, over an S1 interface (e.g., using S1 flow 152 in FIG. 1), and to a neighboring eNodeB, such as eNodeB 112 in FIG. 1, over an X2 interface (e.g., using X2 flow 151 in FIG. 1). Note that the neighboring eNodeB and the EPC network also report the received alarms to the Alarm Performance Monitoring Management Module to be analyzed by the RMM. Then, the RMM, such as RMM 131 in FIG. 1, correlates all radio related alarms reported by the service affecting eNodeB, by the neighboring eNodeB, and by the EPC network to identify the service affecting radio transceiver.

In another embodiment, an eNodeB, such as eNodeB 111 in FIG. 1, is experiencing a service outage triggering RRH failure alarms, eNodeB heartbeat failure alarms, and BBU failure alarms. These alarms are sent by the eNodeB to the Alarm Performance Monitoring Management Module, such as Alarm Performance Monitoring Management Module 132 in FIG. 1, to the EPC network, such as EPC network 103 in FIG. 1, over an S1 interface (e.g., using S1 flow 152 in FIG. 1), and to a neighboring eNodeB, such as eNodeB 112 in FIG. 1, over an X2 interface (e.g., using X2 flow 151 in FIG. 1). Note that the neighboring eNodeB and the EPC network also report the received alarms to the Alarm Performance Monitoring Management Module to be analyzed by the RMM. Then, the RMM, such as RMM 131 in FIG. 1, correlates all eNodeB failure related alarms reported by the service affecting eNodeB, by the neighboring eNodeB, and by the EPC network to identify the service affecting eNodeB. Note that an eNodeB heartbeat failure alarm is sent by the service affecting eNodeB to the EPC network over the S1 interface and to the neighboring eNodeB over the X2 interface.

In another embodiment, a cell site served by an eNodeB, such as eNodeB 111 in FIG. 1, is experiencing a power failure triggering both power failure alarms and heartbeat failure alarms. These alarms are sent by the eNodeB to the Alarm Performance Monitoring Management Module, such as Alarm Performance Monitoring Management Module 132 in FIG. 1, to the EPC network, such as EPC network 103 in FIG. 1, over an S1 interface (e.g., using S1 flow 152 in FIG. 1), and to the SIAD, such as SIAD 105 in FIG. 1. Note that the SIAD and the EPC network also report the received alarms to the Alarm Performance Monitoring Management Module to be analyzed by the RMM. Then, the RMM, such as RMM 131 in FIG. 1, correlates all eNodeB failure related alarms reported by the service affecting eNodeB, by the SIAD, and by the EPC network to identify the service affecting cell site power failure. Note that an eNodeB heartbeat failure alarm caused by the power failure is sent by the service affecting eNodeB to the EPC network over the S1 interface.

In step 211, the method performs an interface down check. For example, the method determines whether the X2 or S1 interface is down. For example, the method may perform a root-cause analysis to isolate to a failed service path, e.g., determining whether the cause is attributable to a radio network layer, a transport layer or due to a protocol problem. For example, the method may execute a call trace function, perform an IP connectivity testing, and/or verify protocol errors. The method then proceeds to step 215.

In step 215, the RMM determines if a service outage or a service degradation has been detected. If no network problem is detected, the method proceeds back to step 210; otherwise, the method proceeds to step 220.

In step 220, the RMM creates a trouble ticket via a TM to track the detected service outage or degradation.

In step 225, the RMM retrieves network topology and eNodeB configuration data from the NID. Network topology data provides information of the connectivity of the underlying transport network that connects an eNodeB system to the EPC network.

In step 230, if method 200 is triggered by an alarm analysis, the RMM performs transport network alarm correlation. Alarm correlation includes, but is not limited to, correlating an interface port alarm with a network facility alarm to identify a network connectivity problem in the transport network. For instance, an interface port alarm on the MSN and a network link facility alarm can be correlated to identify a fiber cut in the transport network. However, if method 200 is triggered by a performance analysis, step 230 will be perceived as an optional step that can be skipped.

In step 235, the RMM determines if the service outage or service degradation is caused by an eNodeB. If the service outage or service degradation is caused by an eNodeB, the method proceeds to step 240; otherwise, the method proceeds to step 238. Namely, method 200 may receive an alarm indicating potentially of an eNodeB problem or a performance statistics alert that is potentially associated with an eNodeB issue.

In one embodiment, the rule management module is able to provide various correlations. For example, a RRH down scenario can be correlated via other radio child alarms (TX/RX Radio Alarms). Then, the rule management module will determine that an eNodeB RRH is down. In another example, eNodeB down scenario can be correlated via EMS eNodeB Heartbeat Failure and eNodeB BBU (all RRH card down) failure and LTE-FM MME-1, MME-2, MME-3, MME-4 (epsEnodeBUnreachable), SGW-1, X2 alarming. LTE-FM correlates all MME alarms as child alarms, X2/SGW alarm are optional, to "eNodeB-1 Down". Then, the rule management module will determine an eNodeB-1 BBU Failure. In another example, site down scenario can be correlated via eNodeB-1, SIAD-1 Heartbeat Failure alarming & power failure alarm, and MME-1, MME-2, MME-3, MME-4, SGW-1/X2 alarming". Then, the rule management module will determine an Cell Site-1 Power/Down Failure. It should be noted that these are only several illustrative scenarios.

In step 238, the RMM issues a command to the RTM to perform an automatic EPC network test. Once the test has been completed and the test results are received from the RTM, the RMM forwards the test results to the network operations center (NOC). For example, the method may perform EPC and CSBH correlation to determine whether there is an EVC failure. For example, the method will correlate an "SIAD Down" alarm and S1 connection failed MME-Pool epsEnodeBUnreachable alarming and "SIAD-Up" MME-Pool epsEnodeBRestarted alarming. The method then determines that an "EVC link is down". The method then proceeds to step 290 to complete the test result forwarding as further discussed below.

In step 240, the RMM sends a command to the RTM to perform a connectivity test between the RTM and the eNodeB in question. Namely, the RMM can issue a test command to the RTM to test the connectivity from the RTS to the eNodeB. If the connectivity test passes, the method proceeds to step 245; otherwise, the method proceeds to step 290. In one embodiment, the connectivity test can simply be an IP ping command that is used to test the connectivity between the RTM and the identified eNodeB. The result of the connectivity test is returned by the RTM to the RMM.

In step 245, the RMM communicates with the EMS and the NID to perform an automatic logical test on the eNodeB associated with the service outage or service degradation. The automatic logical test is a test on the logical components of a network element, e.g., an eNodeB in the LTE network. Logical components of an eNodeB include, but are not limited to, configuration data such as CPRI link speed, cell site identifier (ID), cell site location, location area, routing area, and cell sector information. In addition, logical components can also refer to software upgrade status, hardware address type, and hardware device identifier (ID) of an eNodeB.

In one embodiment, the automatic logical test checks for software upgrade failure due to a failed software download or rollback, e.g., a corrupt software upgrade package. In another embodiment, the automatic logical test checks for eNodeB hardware address and logical configuration data mismatch between the data stored in the eNodeB system and the configuration data retrieved from the NID in step 225. For example, a hardware address mismatch can occur if the retrieved NID configuration data shows an IPv6 address type while the stored configuration data residing in the eNodeB indicates an IPv4 address type. A hardware device identifier (ID) mismatch can occur if the retrieved NID configuration data shows hardware device ID that does not match with the hardware device ID stored in the eNodeB. A configuration data mismatch of the speed of a CPRI link can occur if the retrieved NID configuration data shows a CPRI data rate of 1.2 Gigabit per second (Gbps) while the stored CPRI configuration data indicates a CPRI data rate of 2.4 Gbps and the like.

In step 250, the RMM determines if the automatic logical test passes. If the automatic logical test passes, the method proceeds to step 265; otherwise, the method proceeds to step 255.

In step 255, the RMM performs an automatic recovery of one or more failed logical components. In other words, the automatic logical test may reveal that one or more logical components have failed. In one embodiment, the RMM communicates with the Element Management System (EMS) associated with the eNodeB causing the service outage or service degradation to perform an automatic recovery for one or more logical components on the eNodeB, e.g., reinstalling the failed software upgrade download or rollback and the like. In another embodiment, the RMM may communicate with the EMS associated with the eNodeB causing the service outage or service degradation to store the correct eNodeB hardware address and configuration data based on the data retrieved from the NID (broadly modifying the configuration data to address a configuration mismatch). For example, in the case of an eNodeB BBU failure, the method will perform the following automated activities: changes the administrative state of the eNodeB BBU to LOCKED; then resets the administrative state of the eNodeB BBU to UNLOCKED, re-verifies the eNodeB BBU functions, if the eNodeB BBU is working fine, then restores the operational state to ENABLED, and if the eNodeB BBU cannot be restored, dispatches a field technician to replace the eNodeB BBU.

In step 260, the RMM checks if the automatic recovery task is successful. If the automatic recovery task is successful, the method proceeds to step 265; otherwise, the method proceeds to step 290.

In step 265, the RMM checks for alarms, alerts, and error messages of physical components associated with the eNodeB. For example, if method 200 was triggered by a performance analysis instead of an alarm analysis, one or more alarms, alerts, and error messages of physical components may not have been received or been made aware to the RMM.

In step 270, the RMM determines if the alarms, alerts, and error messages of physical components associated with the eNodeB are found. If alarms, alerts, and error messages are found, the method proceeds to step 275; otherwise, the method proceeds to step 285. Alarms associated with an eNodeB may include major equipment alarms indicating failure of the power supply or any other physical components (e.g., a card within the BBU) of a BBU associated with the eNodeB. Error messages associated with the eNodeB include messages indicating cell capacity problem, radio link failure, handover failure rate over a predefined threshold, or radio interference.

In step 275, the RMM identifies the failed or degraded physical component associated with the eNodeB and then performs an automatic repair on the identified physical component. Physical components associated with the eNodeB system include the DU card, the TRX cards, the RRH cards, the power supply, and the RRHs. Automatic repair actions include remotely resetting the failed or degraded physical component, e.g., sending a reset command or simply causing the power to the affected physical components to be interrupted and then restored. In one embodiment, a particular port on a TRX card can be remotely reset. In another embodiment, a circuit card, such as the DU, TRX, or RRH cards, can be remotely reset. In another embodiment, the antenna transceiver parameters, such as tilt and azimuth, can be remotely adjusted (physically or electrically). The remote repair actions are performed by the RMM via the EMS with remote commands.

In step 280, the RMM checks if the automatic repair of the failed physical component is successful. If the repair is successful, the method proceeds to step 285; otherwise, the method proceeds to step 290.

In step 285, the RMM closes via the TM the trouble ticket previously opened in step 220. Namely, since the detected problem was either resolved or confirmed to be potentially a false alarm, the trouble ticket can be closed.

In step 290, the RMM notifies the NOC via the NM to perform special handling. For example, if this step is reached from step 238, the RMM forwards the test results from the RTM to the NOC for further analysis and action. If this step is reached from step 240, the RMM notifies the NOC that the eNodeB is unreachable and the NOC will then dispatch a network technician to the eNodeB to perform manual troubleshooting and repair. If this step is reached from step 260, the RMM notifies the NOC that the automatic logical recovery test has failed and the NOC will then dispatch a network technician to the eNodeB site to perform manual troubleshooting. If this step is reached from step 280, the RMM notifies the NOC that the automatic physical component repair has failed and the NOC will then dispatch a network technician to the eNodeB site to perform physical component replacement. The method ends in step 295.

Broadly, one or more of steps 225, 230, 235, 240, 245, 250, 265, 270 and 275 can be perceived as isolating the potential wireless network problem to one or more eNodeBs that are likely the cause of the potential wireless network problem.

It should be noted that although not explicitly specified, one or more steps of the method 200 described herein may include a storing, displaying and/or outputting step as required for a particular application. In other words, any data, records, fields, and/or intermediate results discussed in the method can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 5:
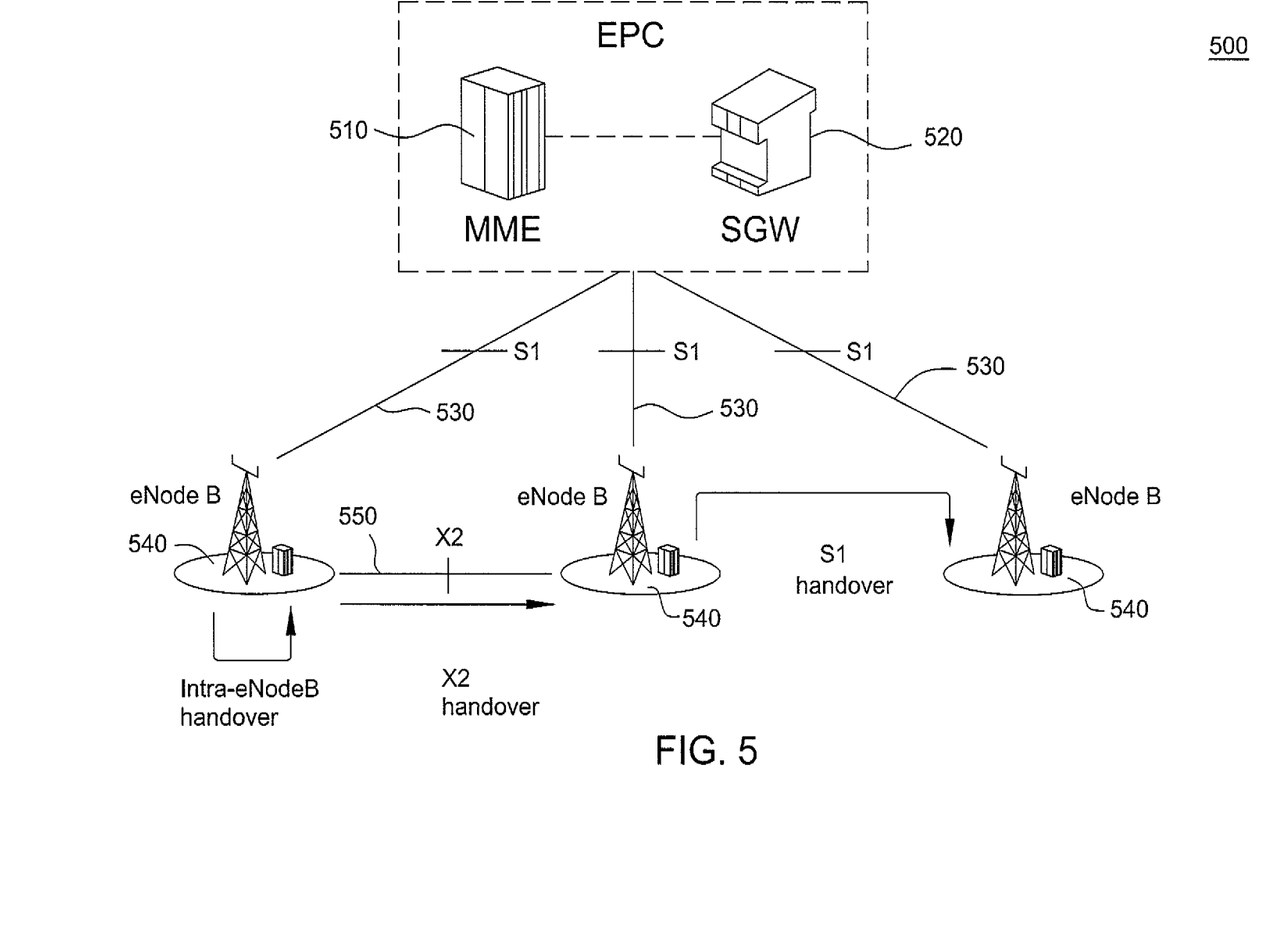
FIG. 5 illustrates a high level diagram of the E-UTRAN and EPC architecture identifying various standard interfaces.

FIG. 5 illustrates a high level diagram of the E-UTRAN and EPC architecture 500 identifying various standard interfaces. In FIG. 5, MME 510 and Serving GW (SGW) 520 are combined in one node for simplicity, but the S1 interface 530 applies to both the MME and Serving GW, independently. The S1 interface allows an eNodeB 540 to be connected to more than one MME or Serving GW node. LTE control plane activities between the eNodeBs take place at the X2-AP protocol layer. Table 1 below provides an LTE eNodeB Logical Network Interface Summary.

TABLE 1

| Interface Domain | NE Pair | | Interface Name | Protocol Stack |
|---|---|---|---|---|
| | NE-A | NE-B | | |
| Control Plane | eNB | eNB | X2-C | X2-AP/SCTP/IP |
| | | MME | S1-MME | S1-AP/SCTP/IP |
| User Plane | eNB | eNB | X2-U | GTP-U/UDP/IP |
| | | S-GW | S1-U | GTP-U/UDP/IP |

In one embodiment, the role of the X2 User Plane Interface 550 (X2-U or X2 User plane interface) is to transport user data packets between eNodeBs. This interface is only used for limited periods of time, when the terminal moves from one eNodeB to another, and provides buffered packet data forwarding. X2-U makes use of the same GTP tunneling protocol already used over the S1-U interface. In one embodiment, the X2 Control Plane Interface (X2-C or X2 Control plane interface) is a signaling interface which supports a set of functions and procedures between eNodeBs. The X2-C procedures are very limited in number and are all related to user mobility between eNodeBs, so as to exchange user context information between nodes (including allocated bearers, security material, etc.). In addition, the X2-C interface may employ a load Indicator procedure whose purpose is to allow an eNodeB to signal its load condition to neighboring eNodeBs. The aim of this procedure is to help the support of load-balancing management, and/or to optimize handover thresholds and handover decisions. The need for a reliable transport of signaling between nodes is the same as over the S1-C interface. This is the reason why X2-C also uses an SCTP over IP transport layer.

In one embodiment, the S1-MME interface or S1 Control plane interface supports a set of functions and procedures between the eNodeB and the MME. These procedures are typically used during the establishment or the release of a communication session. In one embodiment, the eNodeB S1 and X2 traffic will be routed from a SIAD to the MSN, where the MSN will IP forward the traffic from multiple SIADs, to the Mobility PE routers and route X2 traffic locally. The S1-MME interface allows an eNodeB to be connected to more than one MME or Serving GW node. S1c or S1-MME is the control interface between eNodeB and MME, where MME and UE will exchange signaling messages via eNodeB through this interface. The eNodeB S1c traffic will be routed from the SIAD to the MSN over the backhaul transport network. The MSN will route the S1c traffic to the Mobility PE routers which are connected to a core router. The traffic will then go via an egress Mobility PE routers and then to the Mobility CE routers co-located with the MME. In one embodiment, the S1u is the user plane interface between the eNodeB and S-GW. The eNodeB S1u traffic will be routed from the SIAD to the MSN over the backhaul transport network. The MSN will route the S1u traffic to the PE routers via the same interface used for S1-c traffic. The traffic will route via the core router to the PE routers where the SGW CE's will connect with other PE routers.

Figure 4:
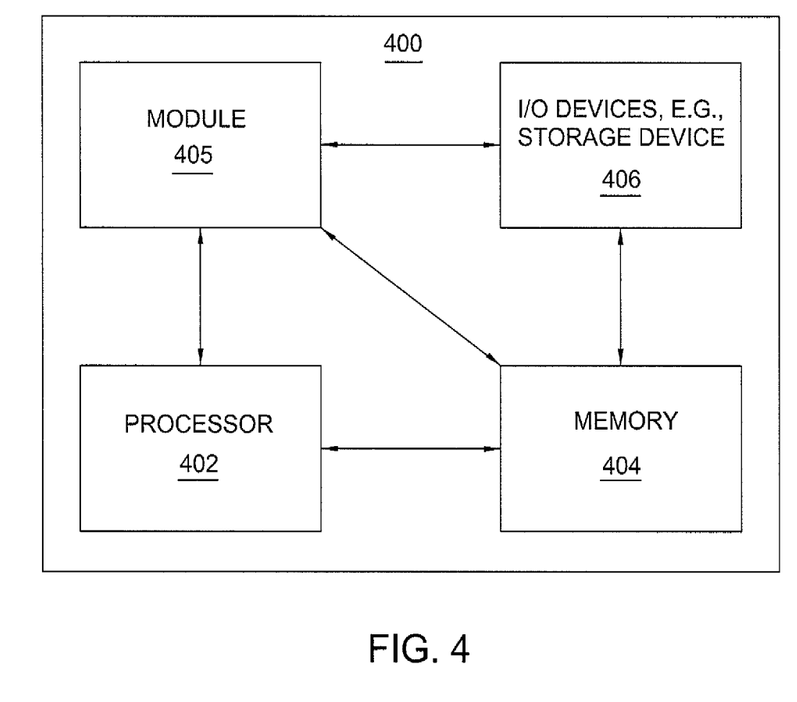
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for enabling service outage and degradation management of an eNodeB, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for enabling service outage and degradation management of an eNodeB can be loaded into memory 404 and executed by processor 402 to implement the functions as discussed above. As such, the present process 405 for enabling service outage and degradation management of an eNodeB (including associated data structures) of the present disclosure can be stored on a non-transistory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing a recovery task on a base station in a wireless communication network, comprising:
   detecting, by a processor, a wireless service problem;
   isolating, by the processor, the wireless service problem to a base station of a plurality of base stations of the wireless communication network, wherein the wireless service problem comprises a wireless service degradation, wherein the isolating comprises:
      performing a network connectivity test between a remote testing module and the base station; and
      performing an automatic logical test on a plurality of logical components on the base station, wherein the automatic logical test comprises checking for a configuration mismatch, wherein the configuration mismatch is determined by comparing configuration data from a network inventory database and configuration data stored on the base station; and
   performing, by the processor, the recovery task remotely on the base station to address the wireless service degradation.

2. The method of claim 1, wherein the detecting comprises:
   correlating a plurality of alarms to detect the wireless service problem.

3. The method of claim 2, wherein the plurality of alarms comprises equipment failure alarms, cell site power failure alarms, and heartbeat failure alarms.

4. The method of claim 1, wherein the detecting comprises:
   correlating at least one performance monitoring parameter to detect the wireless service problem.

5. The method of claim 4, wherein the at least one performance monitoring parameter comprises at least one of: a successful bearer setup rate, a dropped call rate, an uplink block error rate, a downlink block error rate, a packet latency parameter, an average ping delay parameter, and a guaranteed bit rate.

6. The method of claim 1, wherein the wireless service problem is detected as a physical component problem.

7. The method of claim 6, wherein the recovery task comprises:
   resetting remotely an identified failed physical component of the base station.

8. The method of claim 1, wherein the wireless service problem is detected as a logical component problem.

9. The method of claim 1, wherein the automatic logical test further comprises:
   checking for a software failure due to a failed software download.

10. The method of claim 9, wherein the recovery task comprises:
    reinstalling the failed software upgrade download.

11. The method of claim 1, wherein the configuration data from the network inventory database and the configuration data stored on the base station relate to at least one of: a link speed, a cell site identifier, a cell site location, a location area, a routing area, cell sector information, a hardware address type, a hardware device identifier, and an internet protocol address type.

12. The method of claim 11, wherein the recovery task comprises:
    modifying the configuration data stored on the base station to remove the configuration mismatch.

13. A method for performing a recovery task on a base station in a wireless communication network, comprising:
    detecting, by a processor, a wireless service problem;
    isolating, by the processor, the wireless service problem to a base station of a plurality of base stations of the wireless communication network, wherein the wireless service problem comprises a wireless service outage, wherein the isolating comprises:
       performing a network connectivity test between a remote testing module and the base station; and
       performing an automatic logical test on a plurality of logical components on the base station, wherein the automatic logical test comprises checking for a configuration mismatch, wherein the configuration mismatch is determined by comparing configuration data from a network inventory database and configuration data stored on the base station; and
    performing, by the processor, the recovery task remotely on the base station to address the wireless service outage.

14. The method of claim 13, wherein the detecting comprises:
    correlating a plurality of alarms to detect the wireless service problem.

15. The method of claim 13, wherein the detecting comprises:
    correlating at least one performance monitoring parameter to detect the wireless service problem.

16. The method of claim 15, wherein the at least one performance monitoring parameter comprises at least one of: a successful bearer setup rate, a dropped call rate, an uplink block error rate, a downlink block error rate, a packet latency parameter, an average ping delay parameter, and a guaranteed bit rate.

* * * * *